United States Patent [19]

Madden et al.

[11] 4,369,570

[45] Jan. 25, 1983

[54] APPARATUS FOR INSERTING INSULATING DISC IN CELL CONTAINER

[75] Inventors: James A. Madden; Kenneth C. LeDuc, both of Gainesville, Fla.

[73] Assignee: General Electric Company, Gainesville, Fla.

[21] Appl. No.: 119,013

[22] Filed: Feb. 6, 1980

Related U.S. Application Data

[63] Continuation of Ser. No. 923,261, Jul. 10, 1978, abandoned.

[51] Int. Cl.³ .............................................. B23P 19/04
[52] U.S. Cl. ..................................... 29/730; 198/485; 414/222; 29/773; 53/319; 53/308
[58] Field of Search ............. 29/730, 731, 773, 623.1, 29/623.2; 53/319, 324, 328, 367, 308; 221/264, 268; 198/391, 485, 490; 414/222, 224

[56] References Cited

U.S. PATENT DOCUMENTS

| | | | |
|---|---|---|---|
| 1,134,626 | 4/1915 | Loehler | 53/319 |
| 1,237,038 | 8/1917 | Hendrickson | 53/319 |
| 1,300,754 | 4/1919 | Miller | 53/319 |
| 1,835,334 | 12/1931 | Risser | 53/319 |
| 1,931,433 | 10/1933 | Davis | 53/319 |
| 1,935,141 | 11/1933 | Compton | 53/367 |
| 1,992,693 | 2/1935 | Fagan et al. | 53/319 |
| 2,049,761 | 8/1936 | Daniels | 53/367 |
| 2,111,155 | 3/1938 | Rue et al. | 53/367 |
| 2,962,846 | 12/1960 | Marindin | 53/306 |
| 3,275,191 | 9/1966 | MacDonald | 221/264 |
| 3,414,111 | 12/1968 | Ernest | 198/391 |

*Primary Examiner*—Daniel C. Crane
*Attorney, Agent, or Firm*—Henry J. Policinski

[57] ABSTRACT

An apparatus for inserting and seating an insulator disc in an electrochemical cell container, the apparatus including a carousel having a plurality of receptacles, an actuator station, an index for moving a receptacle with a container therein to the actuator station, a plunger assembly in the actuator station for receiving, holding and releasing an insulator disc feed thereto and for aligning such disc with the open end of the container at the actuator station, shuttle means for feeding an insulator disc to the plunger assembly and means for feeding the discs to the shuttle including means for rejecting discs which are upside down.

2 Claims, 17 Drawing Figures

APPARATUS FOR INSERTING INSULATING DISC IN CELL CONTAINER

This is a continuation of application Ser. No. 923,261 filed July 10, 1978, now abandoned.

This invention relates to apparatus for aligning and inserting a dielectric disc into the end of a galvanic cell and, more particularly, to apparatus for aligning and inserting a dielectric plastic disc into the end of an electrochemical cell.

The positive and the negative plate materials in the manufacture of electrolytic cells or batteries of the type to which this invention particularly relates are cut into cell strip lengths and, with separator material between the plates, are would into a coil. The wound coil is then inserted into a preformed cylindrical container through the opened container end. The coil wound negative plate strip is connected to the container wall and the coil wound positive plate strip is connected to a tab which stands upwardly from the coil at the opened end of the cylindrical container.

Electrolyte is then added to the container, the end of the coil exposed at the open container end is covered with an insulating disc, the tab is welded to the cover and the cover is placed over the insulator disc and the open end of the cell is then closed. The open end of the container is closed by compressing or crimping the container wall around the cap or cover to form, with such cap or cover, a liquid tight and gas tight closure over the wound coil and the electrolyte in the cell.

The insulator or dielectric plastic disc which is aligned with and inserted into the open end of the cell container during the assembly of the cell is aligned and inserted after electrolyte has been added to the open ended cylindrical container. So that the cap or cover might be inserted and placed over the coil end at the open end of the container and the container wall might be compressed or crimped around the cap, the insulator or dielectric disc must be pressed into the container and brought substantially into contact with the end of the coiled plates. This has been accomplished, heretofore, primarily by hand, has been a slow and expensive process and has required care and precautions so that the operator, in installing, inserting and pressing the dielectric disc into the container does not damage the container end, cut his hand or fingers on the sharp edge of the container and contaminate any cut with electrolyte then present in the cell.

In the instant invention, the problems, dangers and expense heretofore experienced in the hand aligning and assembling dielectric insulator discs into the open end of cell containers is overcome and avoided by sorting, aligning and inserting the disc with apparatus which is both new and novel. In the apparatus of the invention, the dielectric discs are supplied in loose bulk to the the hopper of a vibratory-centrifugal feed. In such feed, the discs are oriented so as to face in the assembly direction and are fed, one after the other, to a transfer station. At the transfer station, the disc is inserted into a fixture. The fixture aligns the open ended cell container with the disc and the disc is then advanced into the aligned container. All of this is done in timed sequence as the open ended container containing the coiled plates is fed by the apparatus to the assembly station, held at the assembly station in front of the aligning fixture and, after the insulating disc is inserted and the fixture is withdrawn, is moved out of and away from the assembly station.

The present invention will be more fully described and will be better understood from the following description of the preferred embodiment taken with the appended drawings in which.

Figures 1, 2:
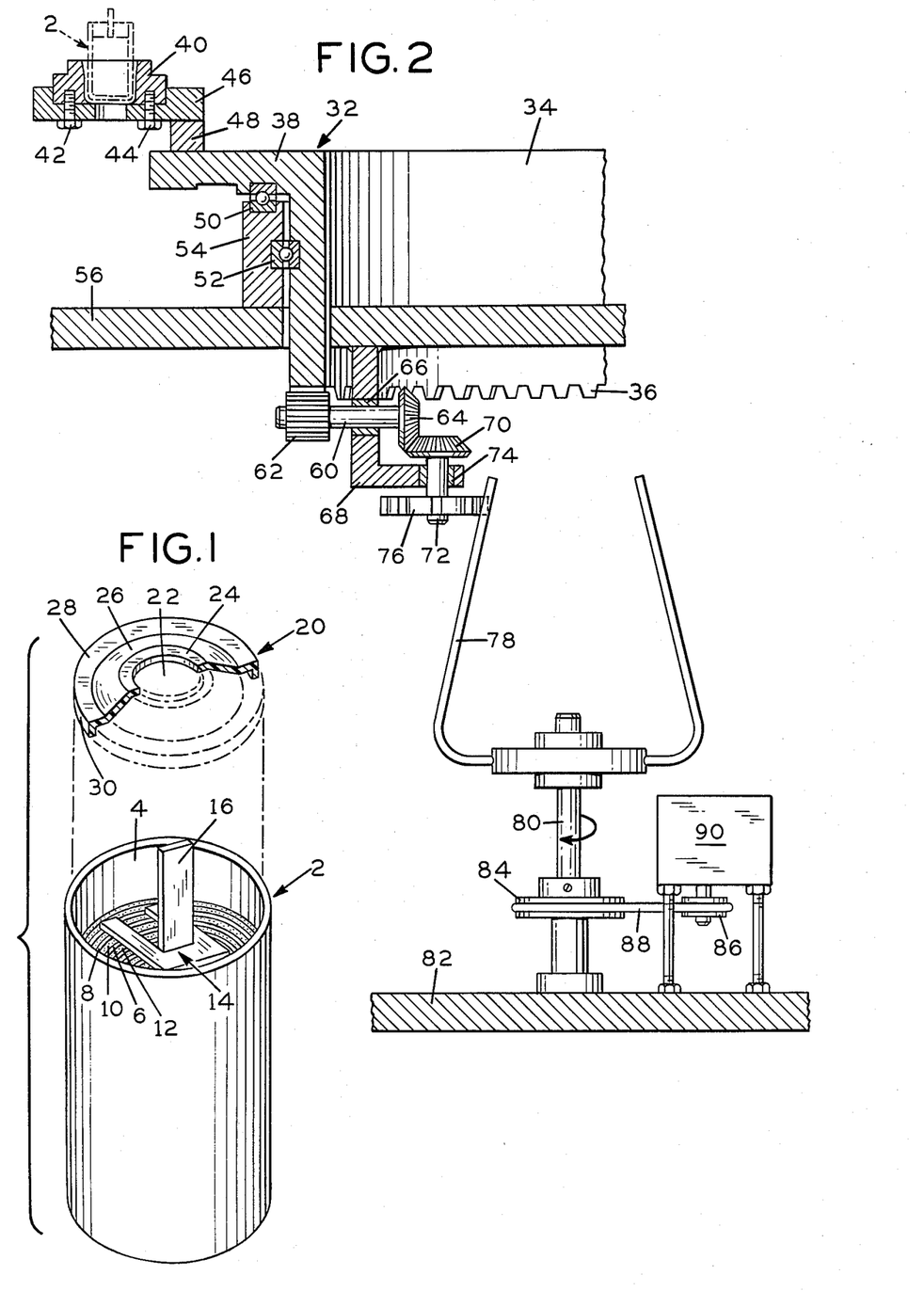
FIG. 1 is an exploded perspective view, partly in section, of the open ended cell container and the insulated cap.
FIG. 2 is a vertical section through the machine showing certain of the machine drives.

Referring to FIG. 1 of the drawings, the container cell, generally designated 2, is open at its upper end 4, and contains coiled therein positive plate 6, negative plate 8 and separators 10, 12 therebetween. Positive plate 6 is connected to tab 14 having an upwardly projecting tongue 16. Negative plate 8 is connected to the wall of container 2 in conventional manner, not shown. Insulator disc, generally designated 20, of dielectric plastic material, such as polypropylene, inert to the electrolyte material of the cell, has a center circular opening 22, a flat surface 24 surrounding the opening, a tapered, conical portion 26, a second flat portion 28, and a circular skirt portion 30. When assembled, as later described, the O.D. of skirt portion 30 fits snugly into the I.D. of container 2, the bottom edge of skirt 30 engages or is in close proximity to the ends of the plates, flat surfaces 28, 24 and conical surface 26 extend over tab 14 and tongue 16 extends upward through circular opening 22. It is to the placement of disc 20 in container 2 so that tongue 16 extends through circular opening 22 that the apparatus of this invention particularly relates.

Referring now to FIG. 2, the apparatus of the instant invention includes a carousel, generally designated 32, having a downwardly extending cylindrical skirt 34 terminating in gear 36 and an outwardly extending platform 38. Receptacle 40 is mounted by screws 42,44 on carrier 46 fixed to spacer 48, in turn, fixed to platform 38. Carousel 32 is mounted by bearing 50,52 on support 54 fixed, such as by welding, to base 56. Shaft 60 is keyed at one of its ends to gear 62 in mesh with carousel gear 36 and, at its opposite end is keyed to spur gear 64. Intermediate its ends, shaft 60 is mounted for rotation in bearing 66 press fitted in support 68 fixed, as by welding to the underside of base 56. Spur gear 64 meshes with spur gear 70 keyed to shaft 72 mounted for rotation in bearing 74 press fitted in support 68. Indexing wheel 76 is keyed to shaft 72 for engagement with indexes 78 fixed to shaft 80 and mounted for rotation on base 82. Pulley 84 is keyed to shaft 80 and pulley 86 is keyed to the drive shaft of motor 90. Pulleys 84,86 are interconnected by belt 88 so that motor 90, through pulleys 84,86, belt 88, shaft 80, indexer 78, indexing wheel 76, shaft 74, spur gears 70, 64, shaft 60 and gears 62,36, turns carousel 32 and advances receptacle 40, for reasons more fully explained later herein.

Figure 3:
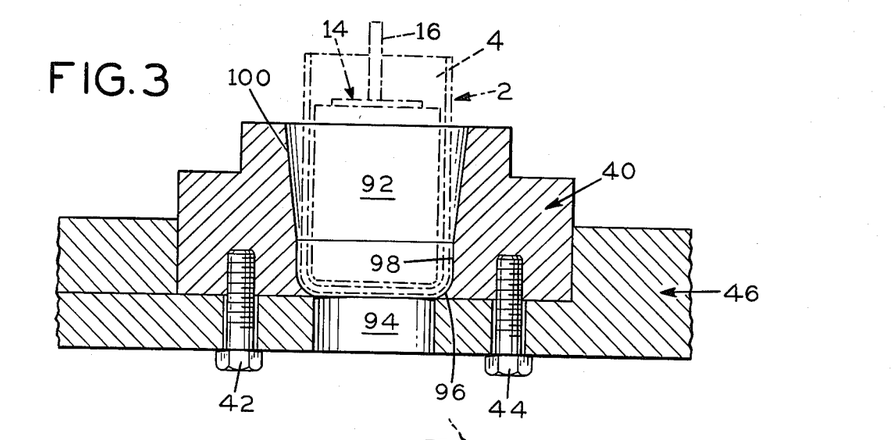
FIG. 3 is an enlarged vertical section of the container holder employed in the invention.

As best shown in enlarged detail in FIG. 3, receptacle 40 has a base 92 extending therethrough and in alignment with base 94 in carrier 46. At its bottom, adjacent carrier 46, at 96 the wall of base 92 is curved to receive the container end and extends upwardly and cylindrically at 98 terminating in an upwardly and outwardly sloping portion 100 for reasons more apparent later herein.

Figure 4:
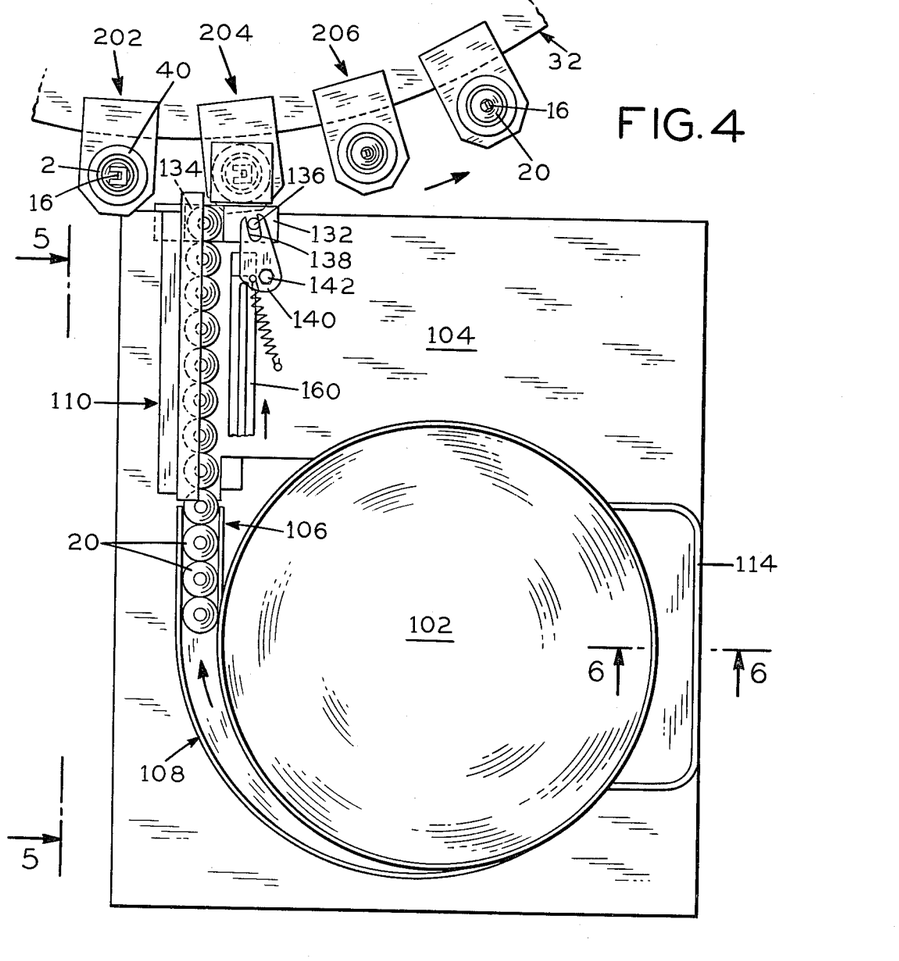
FIG. 4 is a planned view of the apparatus of the instant invention showing a portion of the cam feed.
Figure 5:
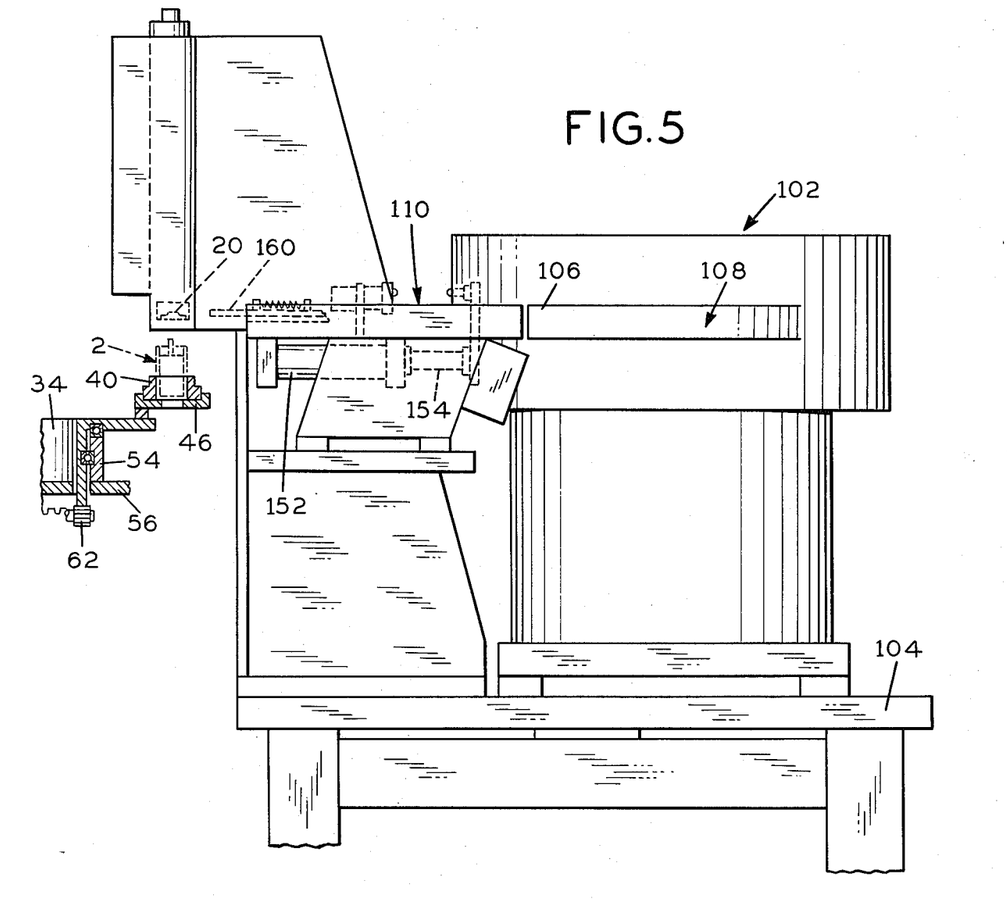
FIG. 5 is a view, in elevation, taken at 5—5, FIG. 4.
Figure 6:
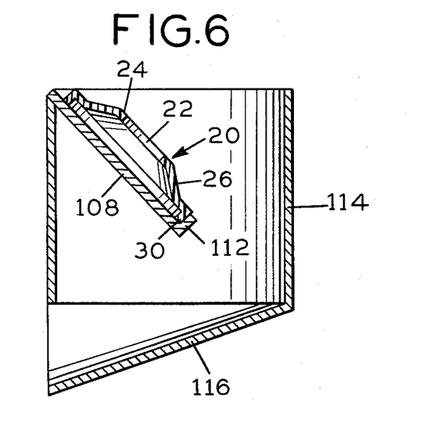
FIGS. 6 and 6A are vertical views, in section, taken at 6—6, FIG. 4, and showing the disc in opposed orientations.
Figure 6A:
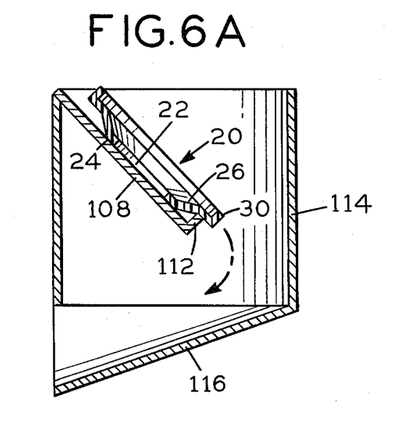

Referring, next, to FIGS. 4 and 5, vibratory-centrifugal hopper 102, of conventional construction, is mounted on table 104 radially outwardly from carousel 32 and receptacle 40 mounted thereon. The discharge end 106 of hopper feed chute 108 is aligned with the in-feed end of transfer chute 110. As best shown in FIGS. 6-6A, at the side of hopper 102 opposite the discharge end 106 of hopper feed chute 108, feed chute 108 is sloped downwardly relative to the hooper and, at its lower end, feed chute 108 is provided with an upwardly extending edge 112, the height of edge 112 being the height of skirt 30 when the skirt side of disc 20 is downward, as in FIG. 6, but less than the over-all height of disc 20 when such disc is in the inverted position, as shown in FIG. 6A, all for reasons more apparent later herein. At such outwardly and downwardly sloping portion of chute 108, and outwardly thereof, hopper 102 has a vertical wall 114 and an inwardly sloping wall 116.

Figures 7, 7A:
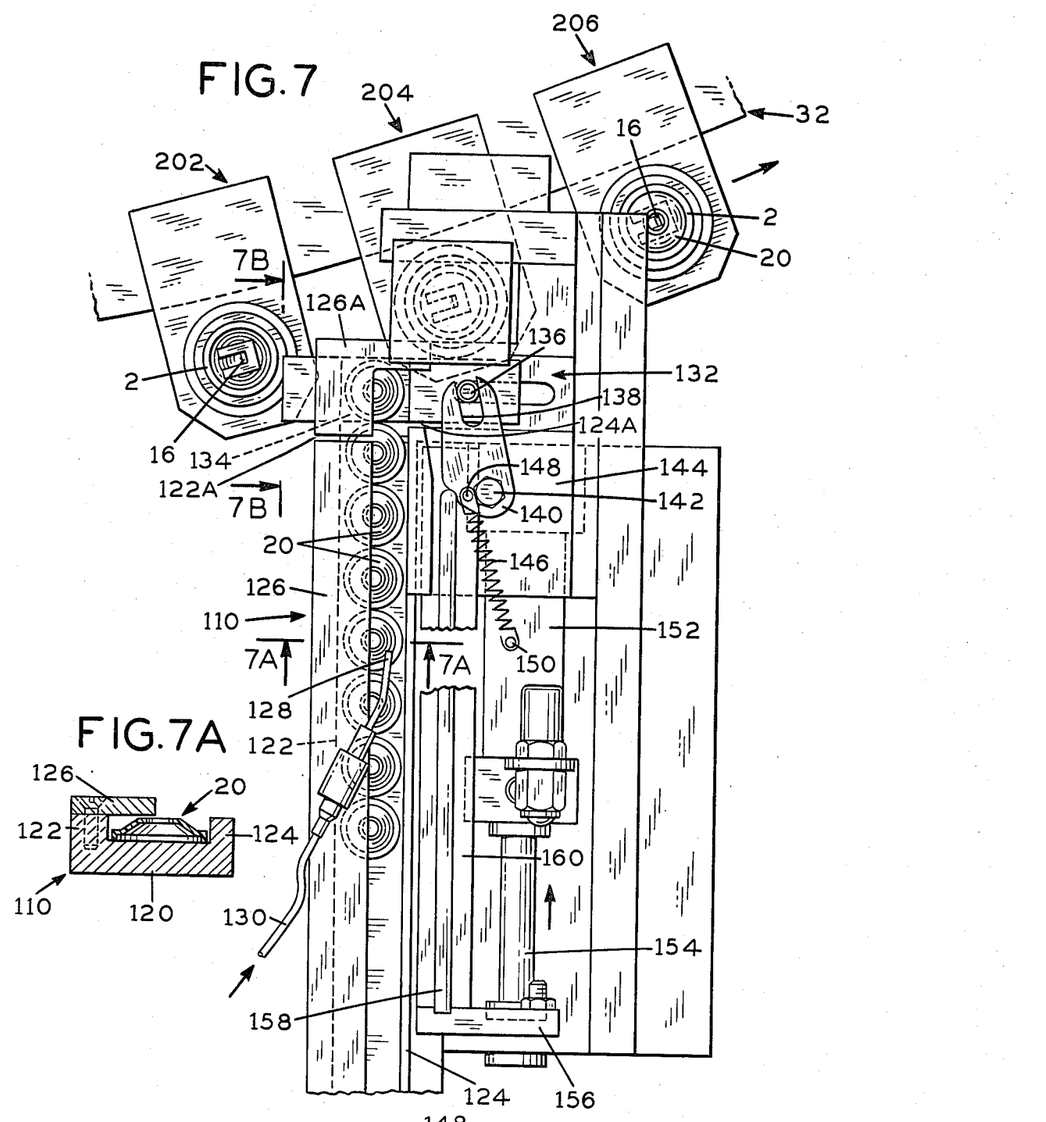
FIG. 7 is an enlarged view of a portion of the apparatus of FIG. 4, showing the feed end portion of the apparatus in enlarged detail with the feed at the beginning of the feed cycle.
FIG. 7A is an enlarged view, in elevation, taken at 7A—7A, FIG. 7.
Figure 7B:
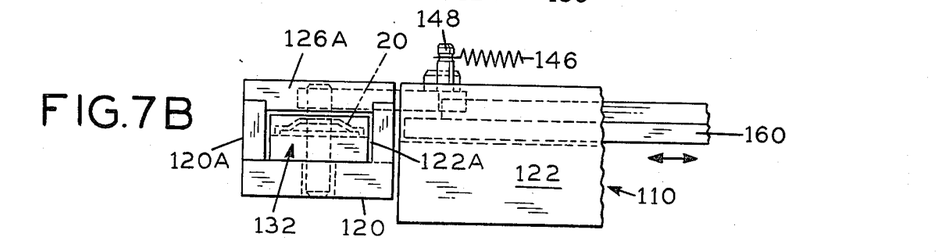
FIG. 7B is an enlarged view, in elevation, taken at 7B—7B, FIG. 7.

As shown in FIGS. 7, 7A and 7B, transfer chute 110 includes base 120 having upwardly extending side rails 122, 124. Cover 126, extending partially across the center feed portion of base 120, is attached to rail 122 leaving one side of the discs 20 being fed along base 122 exposed in the air stream of air jet 128 connected by line 130 to a source, not shown, of compressed air. At its forward end, cover 126 is "L" shaped and, at 126A, extends transverse of the end of base 120 for purposes later described. The end of base 120, at 120A, is closed and the ends of side rails 122, 124, at 122A, 124A are open, FIG. 7B.

Figure 8:
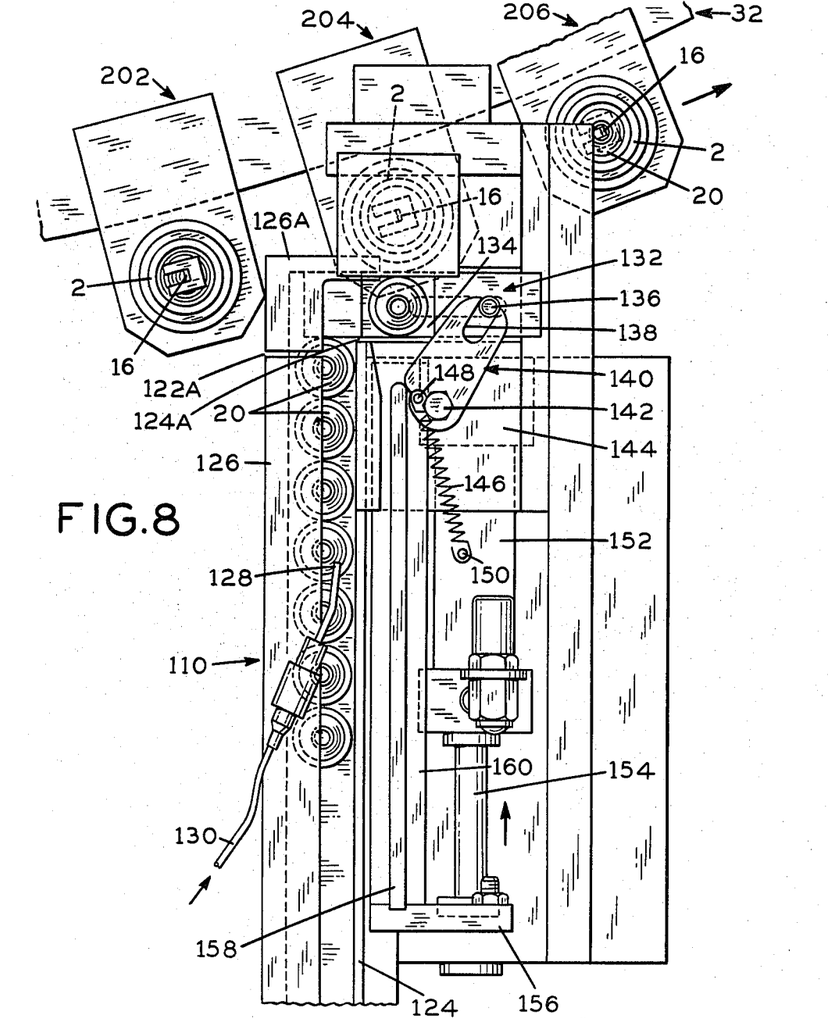
FIG. 8 is a view similar to FIG. 7 but showing the feed end at an advanced, intermediate stage of feed.
Figure 8A:
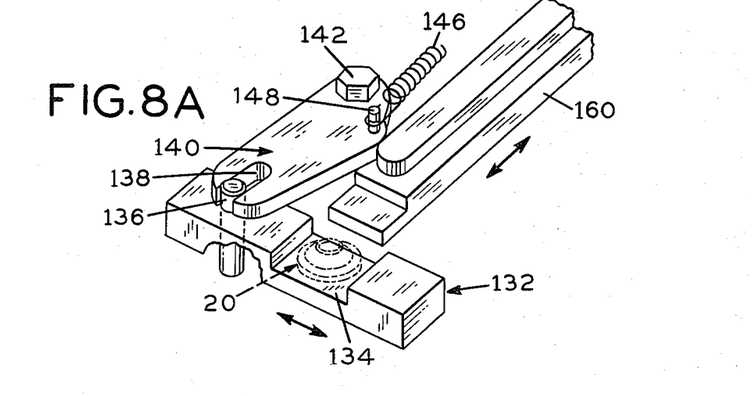
FIG. 8A is an enlarged perspective view showing certain of the elements in the feed.
Figure 9:
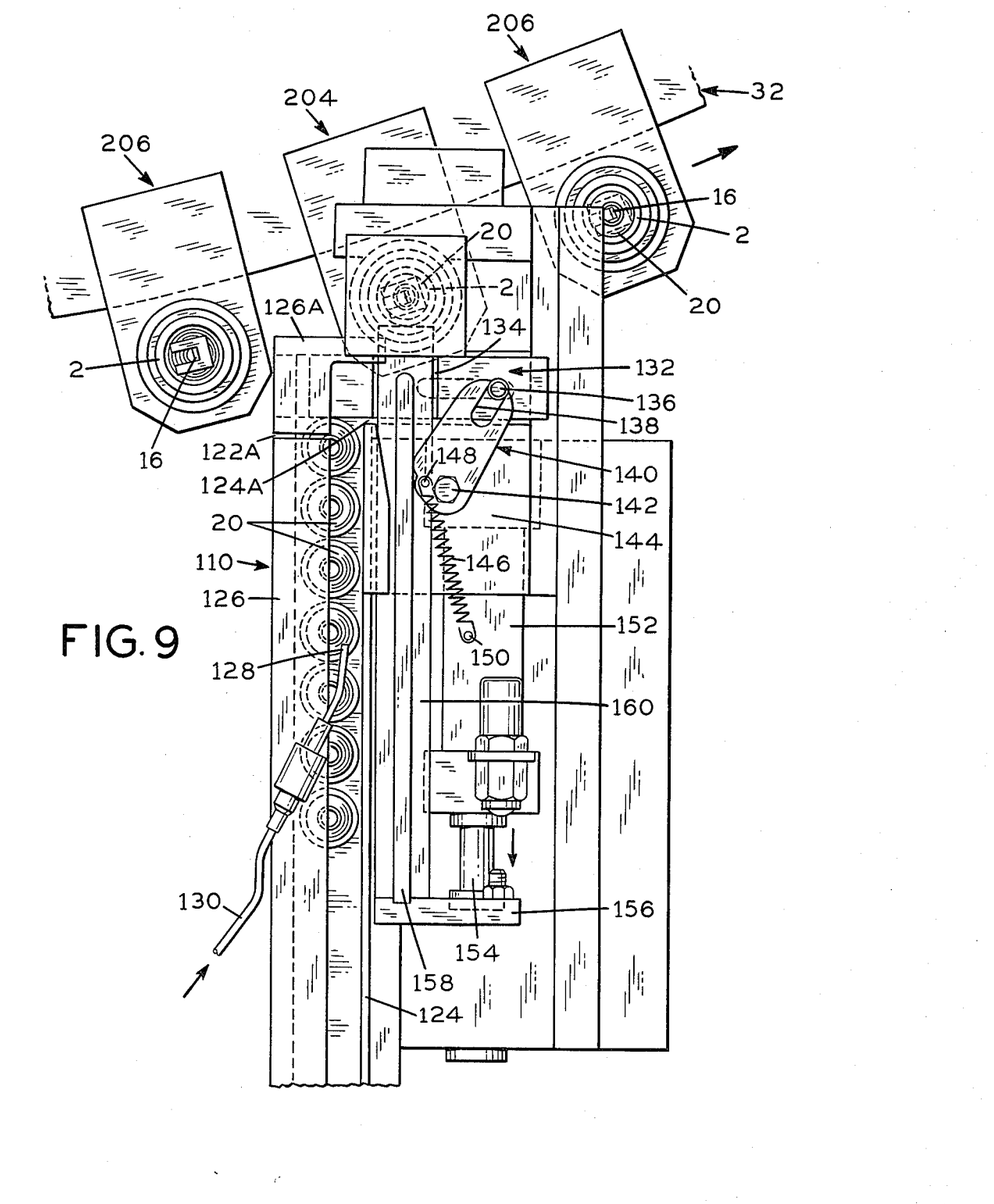
FIG. 9 is a view, similar to FIGS. 7 and 8 but showing the feed at a further advanced step in the feed cycle.
Figure 10:
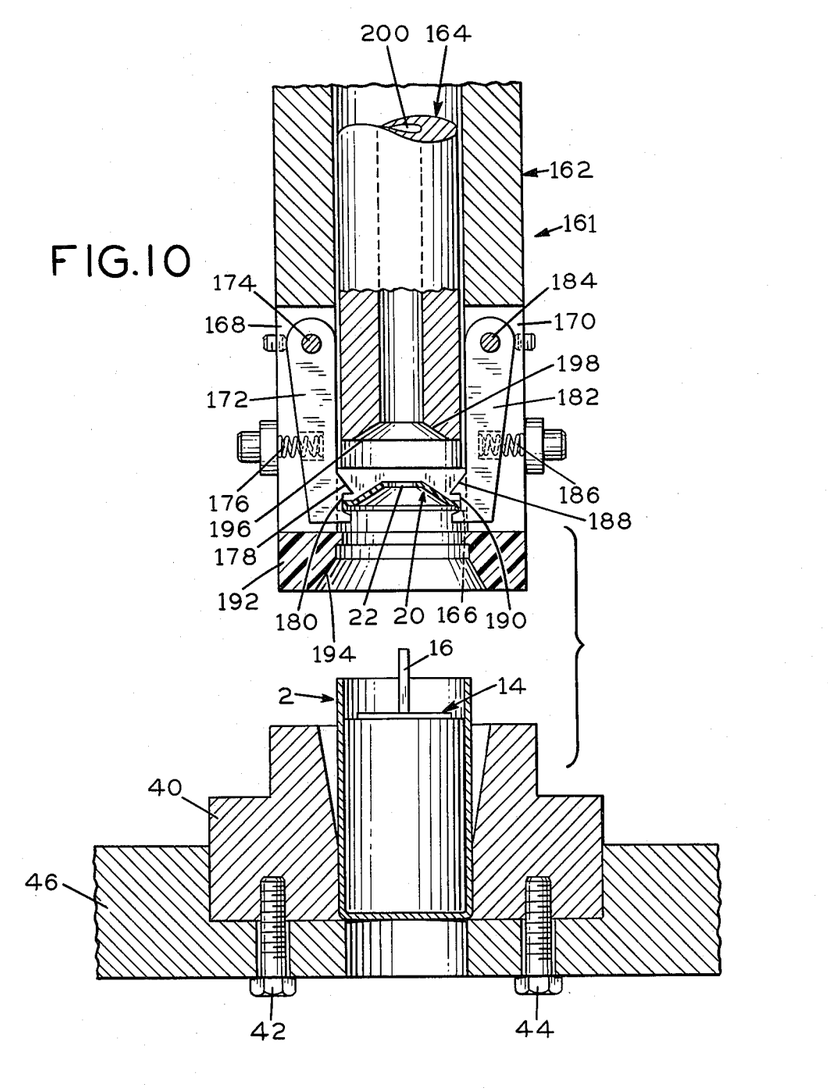
FIG. 10 is an elevation view, in section, showing the insulator disc in position for vertical feed before vertical feed commences.
Figure 11:
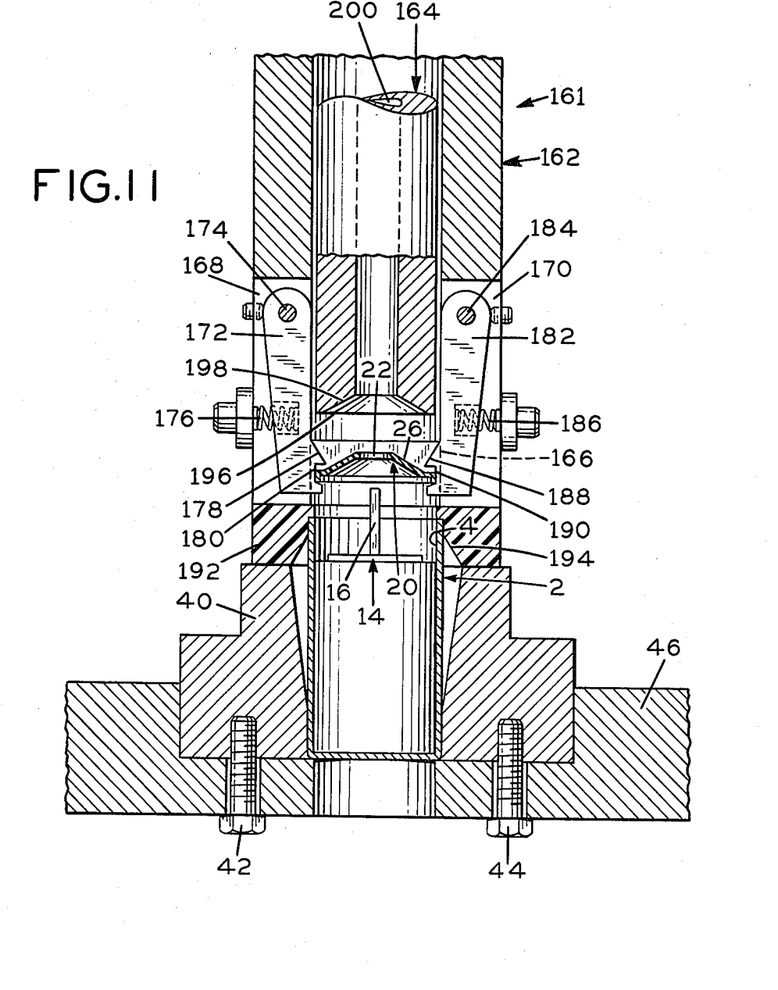
FIG. 11 is a view similar to FIG. 10 but showing the vertical feed at the initial stage of advancement with the open end of the cell container aligned with the vertical feed element and the insulator disc to be inserted.
Figure 12:
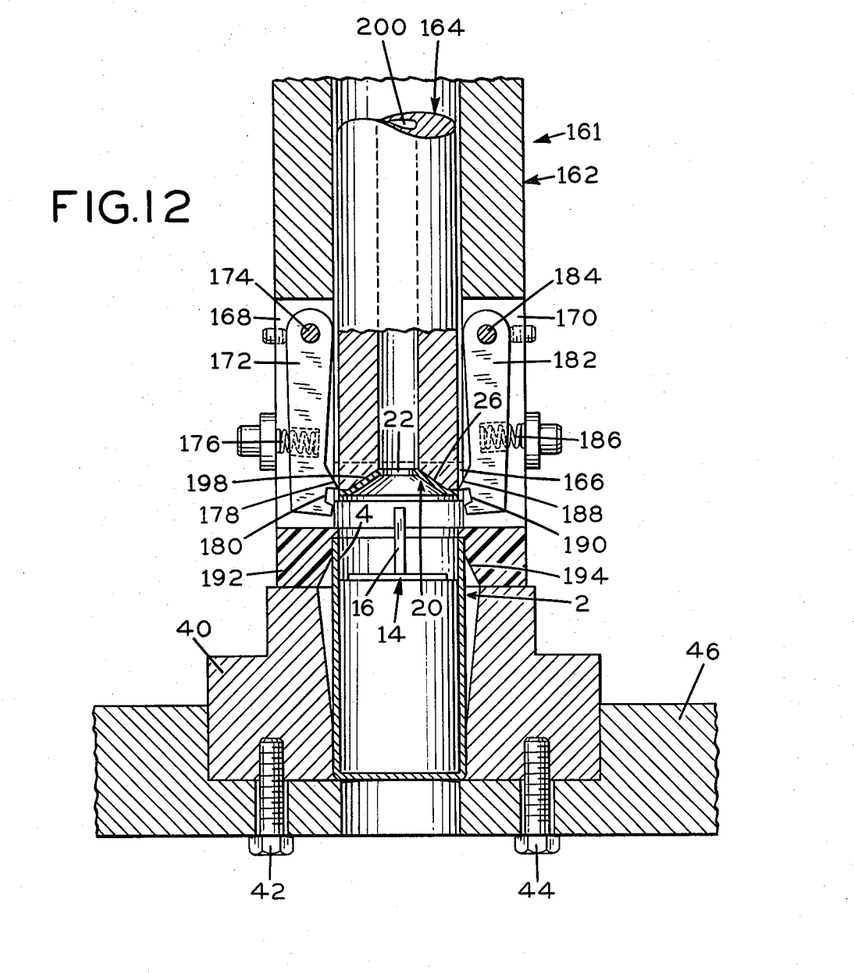
FIG. 12 is a view similar to FIG. 11 but showing the disc at the initial stage of vertical feed.
Figure 13:
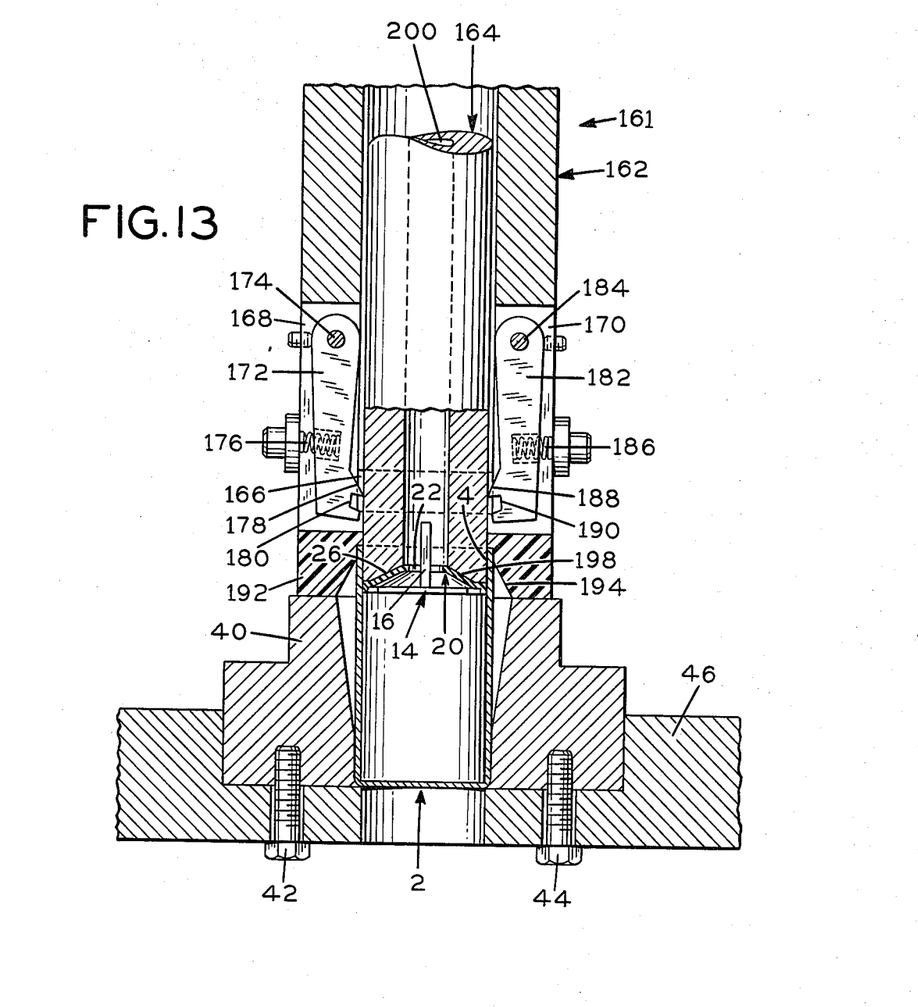
FIG. 13 is a view, similar to FIG. 12, but showing the disc at the final stage of advancement, in the container and at the position just before the vertical feed is withdrawn.

Shuttle 132, FIGS. 7, 7A, 7B, 8, 8A and 9, is mounted for sliding movement through opening 122A, 124A in side rails 122, 124, respectively, and has a recess 134 for receiving discs 20, one at a time, for purposes hereinafter described. Pin 136, fixed to shuttle 132 extends upwardly above shuttle 132 and downwardly below the shuttle. Below the shuttle, pin 136 guides shuttle 132. Above shuttle 132, the upwardly extending portion of pin 136 is engaged in bifurcation 138 of shuttle latch 140 pivoted at bolt 142 to stationary housing 144. Tension spring 146 is connected, at one of its ends, to pin 148 fixed to shuttle latch 140 and, at its other end, to pin 150 mounted on cylinder 152 fixed to stationary housing 144. Piston rod 154, connected in cylinder 152 to the piston, not shown, is connected at its opposite end to plate 156, in turn connected, at 158, to actuator rod 160. As best shown in FIGS. 7, 8 and 9, as cylinder 152 is energized, advancing the piston in the cylinder, piston rod 154 moves in the direction of the arrows FIGS. 7, 8 and 9, swings shuttle latch 140 clockwise around bolt 142, tensioning spring 146 and advancing shuttle 132, and disc 20 there, from left to right until recess 134 in shuttle 132, and disc 20 therein, are aligned with the end of actuator rod 160. When such alignment occurs, the end of rod 160 is clear of shuttle latch 140, and rod 160 advances pushing disc 20 in recess 134 of shuttle 132 out of the recess and into the vertical actuator, as will be described.

Vertical actuator, generally designated 161, FIGS. 4, 5, 10, 11, 12, 13, includes co-axial outer cylindrical plunger 162 and inner cylindrical plunger 164. At their upper ends, not shown, plungers 162, 164 are connected to piston rods of piston and cylinder operators, also not shown. The I.D. of outer plunger 162 is slightly larger than the diameter of disc 20. The vertical side wall of outer plunger 162 facing recess 134 in shuttle 132 and in line with such recess is provided with a horizontal slot 166 having a width slightly larger than the diameter of disc 20 and a height slightly higher than the height of such disc. At either side of horizontal slot 166, the vertical side wall of outer plunger 162 is provided with vertical slots 168, 170 facing each other from the opposite sides of the I.D. of plunger 162 and at right angle to disc 20 and the direction in which such disc is fed through slot 166 and into the I.D. of plunger 162, as will be later described. Latch 172 is pivoted at 174 in slot 168 and is urged inwardly, toward the center of plunger 162, by compression spring 176. Just below the end of spring 176, the inner edge of latch 172 is beveled inwardly, at 178 and, below bevel 178, has a recess 180. Latch 182 is pivoted at 184 in slot 170 and is urged inwardly, toward the center of plunger 162, by compression spring 186. Just below the end of spring 186, the inner edge of latch 182 is beveled inwardly at 188 and, below bevel 178, has a recess 190. The lower end 192 of plunger 162 is of a hard plastic material and is beveled at 194 to receive and align container 2 as plungers 162, 164 are lowered, see FIGS. 11, 12 and 13. The bottom end 196 of inner plunger 164 is tapered, at 198, to fit the tapered conical surface 26 of disc 20 when plunger 164 is advanced, contacts disc 20 and advances the disc into the open end of container 2, as will be described. Inner plunger 164 is bored at 200 to receive cell tongue 16 when plunger 174 is advanced.

In the operation of the apparatus of the instant invention, the hopper of vibratory-centrifugal feeder 102, FIGS. 4 and 5, is filled with loose insulator discs 20 and the vibratory feeder vibrates and feeds discs 20 centrifugally outwardly and up and around the track in the feeder bowl in conventional manner. In feeding such discs along the track, the discs 20 advance, one after the other, along the sloping portion 108, FIGS. 6 and 6A of the track. Those discs which are right side up, as shown in FIG. 6, are retained on the track by shute edge 112, are held on the track and are advanced to feed transfer chute 110, FIGS. 4, 5, 7, 8, 9. The discs 20 which arrive at the sloped portion 108, FIG. 6A, slide over edge 112, fall off of track 108 onto inwardly sloping wall 116 and are returned to the vibratory feed hopper bowl.

Insulator discs 20 are fed from said hooper track 108, FIG. 4, to transfer chute 110, FIGS. 4, 7, 8 and 9, and are advanced along transfer chute 110 by the air stream from air jet 128. At the forward end of transfer chute 110, FIG. 7, the leading disc 20 slides into shuttle 132.

While discs 20 are being fed and oriented by vibratory-centrifugal feed hopper 102, motor 90 and the indexer feed driven thereby, FIG. 2, indexes carousel 32 to advance the open ended cell in receptacle 40 at feed station, generally designated 202, FIGS. 4, 7, 8 and 9 immediately ahead of assembly station 204 to the assembly station. When carousel 32 is indexing the open ended cell from station 202 to assembly station 204, actuator 160, FIGS. 10, 11, 12 and 13 is at the raised position, FIG. 10.

With the open ended cell at assembly station 204 and the lead disc 20 in shuttle 132, air pressure is introduced into cylinder 152 advancing the piston therein and piston rod 154, in the direction of the arrow, FIG. 7. As piston rod 154 advances toward carousel 32, FIG. 7, plate 156 and actuator 160 pivot shuttle latch 140 clockwise around bolt 142, advancing the shuttle from left to right, FIGS. 7 and 8, aligning recess 134 in shuttle 132 containing insulator disc 20 with horizontal slot 166 in plunger 162. With recess 134 in shuttle 132 aligned with horizontal slot 166, actuator rod 160 pushes disc 20 from recess 132 through slot 166 and into recesses 180, 190 of latches 172, 182, FIG. 10. Air pressure is then released from cylinder 152, returning piston rod 154 and actuator rod 159 in the direction of the arrow, FIG. 9, returning shuttle 132 from right to left and to its initial position, FIG. 7, where shuttle recess 134 receives the next disc 20 for the subsequent operating cycle.

With disc 20 in recesses 180, 190 of latches 172, 182 and disc 20 held in position by latches 172,182, vertical actuator assembly 161 is lowered by actuating the air cylinders connected thereto. As bevel 194 at the lower end 192 of plunger 162 contacts the upper end of container 2 in receptacle 40, any misalignment of container 2 with actuator assembly 161 is overcome by the adjustment of the container in receptacle 2 by tapers 198 and the movement of cell 2 relative to receptacle 40 at sloping wall 100 of the receptacle.

With vertical actuator assembly 161 and container 2 aligned, the lower end 192 of plunger 162 is in contact with the upper surface of receptacle 20. With the lower end 192 of plunger 162 in contact with the upper surface of receptacle 40, inner plunger 164 is advanced, contacts bevels 178, 188 on latches 172, 182, pivots latches 172, 182 outwardly about pivots 174, 184 and releases disc 20 from recesses 180, 190 in latches 172, 182. As plunger 164 continues to advance vertically downward, FIGS. 12 and 13, tab 14 in container cell 2 projects upwardly into bore 200 and taper 198 contacts tapered conical surface 26 of disc 20 advancing the disc into the open end of container 2. When disc 20 is seated in container 2, FIG. 13, the air cylinders actuating vertical actuator 161 and plungers 162, 164, are reversed, raising the actuator and plungers and returning the actuator assembly to its initial position, FIG. 10.

The foregoing operating cycle is continued as each container 2 is advanced from station 202 to station 204. After insulator disc 20 has been inserted and seated in the container, the container is indexed from station 204 to station 206 and the following container at station 202 is, at the same time, indexed into station 204. The operating cycle is repeated.

In the operation of the apparatus of the instant invention the containers are indexed, the insulator discs are fed and are inserted and seated into the container automatically by the apparatus without any handling of the container by an operator. Thus, the expenses, dangers and problems heretofore encountered in the hand aligning and assembly of the insulator disc is avoided.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for aligning and inserting insulator discs, having apertures therein, into the open ends of electro-chemical cells each of which has an upstanding terminal, said apparatus comprising:

a plunger having a central bore large enough to encircle the upstanding terminals of said cells;

means for positioning one of said cells with its upstanding terminal in alignment with the axis of said plunger bore;

means for advancing said plunger axially along a path of travel toward said positioned cell;

means for releasably holding one of said discs with the aperture thereof in registration with said plunger bore, said holding means being engageable by said plunger upon advancement thereof for causing said holding means to release said one disc, said plunger upon further advancement thereof pressing said one disc into the open end of said cell, with the upstanding terminal protruding through the aperture of the disc and into said plunger bore;

shuttle means for conveying one of said discs to a site alongside said path of travel;

actuator means supported for movement across said shuttle to said path of travel for displacing said one disc from said shuttle means to said holding means, said actuator means movable independent of relative movement between said plunger and said releasable holding means; and latch means coupled to said shuttle means, and positioned for engagement with said actuator means, an advancement of said actuator means operating said latch means to drive said shuttle means from a first position wherein said one disc may be loaded onto said shuttle means to a second position wherein said one disc is alongside said path of travel.

2. An apparatus according to claim 1 wherein said shuttle means includes a recess for holding said one disc, said recess being alongside said path of travel of said plunger and within a path of travel of said actuator when said shuttle means is in said second position.

* * * * *